United States Patent [19]
Ricard

[11] Patent Number: 5,046,241

[45] Date of Patent: Sep. 10, 1991

[54] PROCESSES AND DEVICES FOR MECHANICALLY CRIMPING TERMINALS ON CONDUCTING WIRES

[76] Inventor: Claude F. Ricard, Villa Sainte Madeleine - 52 Cours Gambetta, 13100 Aix-en-Provence, France

[21] Appl. No.: 411,323

[22] Filed: Sep. 22, 1989

[51] Int. Cl.[5] ........................ H01R 43/04; B23P 19/00

[52] U.S. Cl. ........................................ 29/863; 29/753; 72/451

[58] Field of Search .......................... 29/863, 753, 747; 72/451

[56] References Cited

U.S. PATENT DOCUMENTS

| | | | |
|---|---|---|---|
| 2,855,971 | 10/1958 | Russell, Jr. | 72/451 |
| 3,599,279 | 8/1971 | McDonald | 72/451 |
| 4,335,497 | 6/1982 | Casey | 29/753 X |
| 4,383,364 | 5/1983 | Casey | 29/863 |
| 4,856,186 | 8/1989 | Yeomans | 29/863 |

FOREIGN PATENT DOCUMENTS

| | | | |
|---|---|---|---|
| 184204 | 6/1986 | European Pat. Off. | 29/753 |
| 547236 | 3/1932 | Fed. Rep. of Germany | 72/451 |
| 3540083 | 5/1987 | Fed. Rep. of Germany . | |
| 2226764 | 11/1974 | France . | |

*Primary Examiner*—Carl E. Hall
*Assistant Examiner*—Carl J. Arbes
*Attorney, Agent, or Firm*—Ladas & Parry

[57] ABSTRACT

This invention relates to processes and devices for mechanically crimping terminals on conducting wires and for adjusting with precision the height of crimping. A device according to the invention is of the type in which a terminal is crimped on the end of a conducting wire by means of crimping tools which are fixed on the plates of a press. The mobile plate is displaced vertically thanks to two articulated connecting rods, horizontally displacing the point of articulation by means of a jack. To adjust the height of crimping, the upper articulation is placed on a slide block which is displaced vertically by means of a conical wedge which is displaced horizontally by means of a percussion tool into an opening having an inclined lower edge. One application of this invention is the mechanical crimping of terminals on wires in a work station equipping an automatic wiring machine.

7 Claims, 2 Drawing Sheets

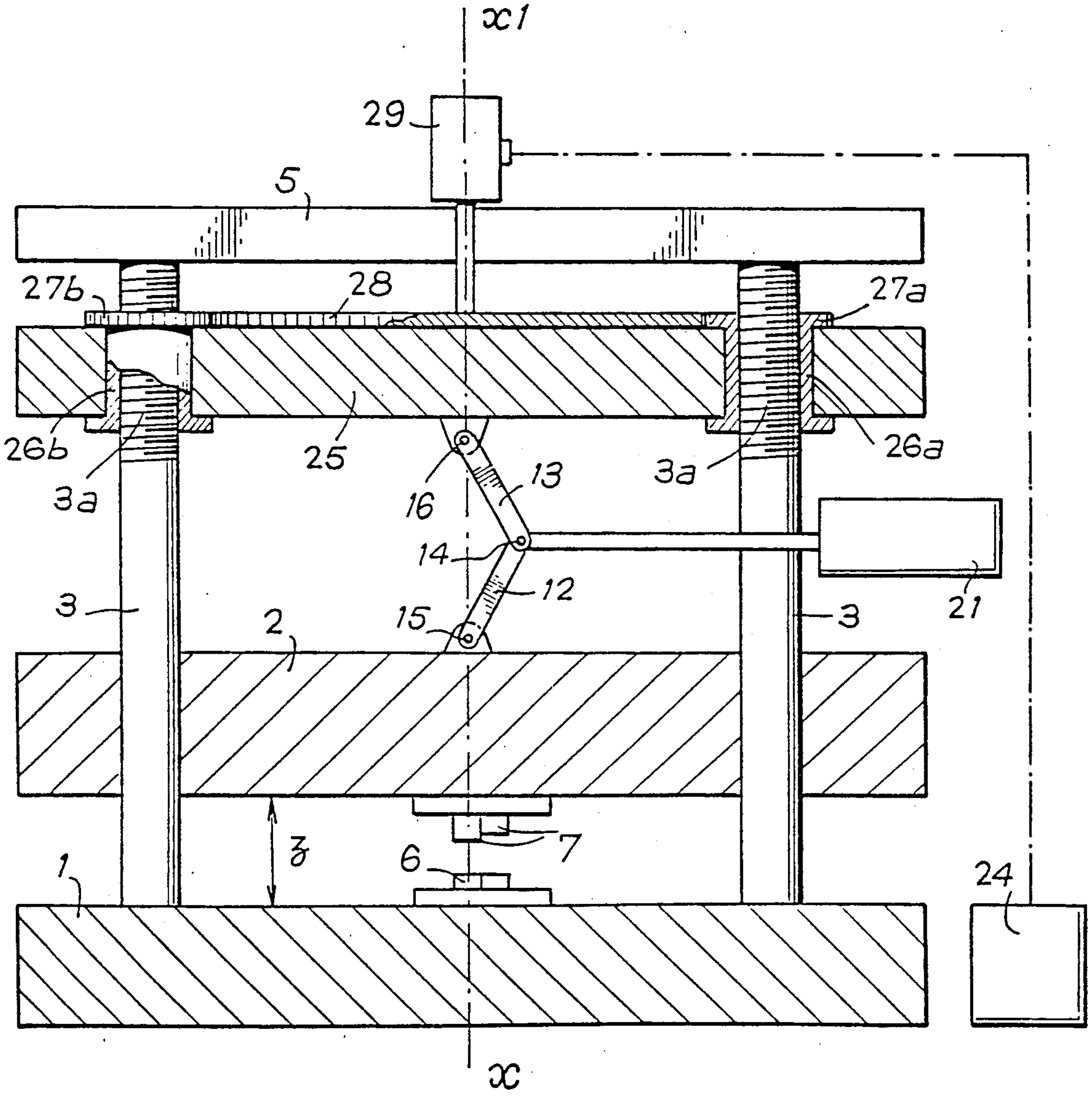
x1
29
5
27b
28
27a
26b
25
26a
3a
16
13
3a
14
12
21
3
2
15
3
7
z
6
24
1
x

PROCESSES AND DEVICES FOR MECHANICALLY CRIMPING TERMINALS ON CONDUCTING WIRES

FIELD OF THE INVENTION

The present invention relates to processes and devices for mechanically crimping terminals on conducting wires and for adjusting with precision the height of crimping. The technical sector of the invention is that of the construction of automatic wiring machines.

BACKGROUND OF THE INVENTION

Automatic cabling machines are being used more and more, which comprise a conveyor serving work stations which select conducting wires, cut them into sections of determined length, strip the ends of the wires and crimp thereon male or female connecting pieces which may have different shapes and which will hereinafter be referred to as terminals.

Mechanical crimping of the terminals is generally effected by placing one end of stripped wire and a terminal between two press plates which bear punches and dies which bend crimping fins on the wire and which deform them permanently so that the terminal is crimped on the end of the wire. This operation is very delicate to carry out mechanically. If the minimum distance between the two plates at the moment of crimping is too large, crimping is not sufficiently tight and the fixation of the terminal risks not withstanding a traction on the wire. If, on the contrary, the height of crimping is too small, the wire and the terminal risk being crushed and the resistance of the electrical connection between the wire and the terminal is no longer in accordance with theoretical values.

It is an object of the present invention to provide means for mechanically crimping a terminal on one end of a conducting wire, with the possibility of adjusting the height of crimping with very high precision, and with the possibility of this height of crimping respecting a reference value determined in each case as a function of the diameter and nature of the wire as well as of the shape and nature of the terminal.

The processes according to the invention are of the known type in which a terminal is mechanically crimped on a conducting wire by using a crimping press comprising a fixed plate and a mobile plate on which a die and a crimping punch are respectively fixed.

SUMMARY OF THE INVENTION

The object of the invention is attained by a process which comprises the following operations of displacing the mobile plate of the press by means of two connecting rods, which are articulated on each other and therefore the point of articulation is displaced to bring it on the line passing through the ends of the two rods, of which one is articulated on said mobile plate and the other is articulated on an adjustable point of support and said point of support is displaced parallel to the direction of displacement of said plates in order to modify the height of crimping.

The point of support is advantageously borne by a slide block mobile in a guide parallel to the direction of displacement of said plates, which block is traversed by an opening having an inclined edge, a wedge is engaged in said opening and in the guide pieces and said wedge is driven in more or less in order to vary the position of said slide block and said point of support.

According to a preferred embodiment, the wedge is displaced by means of a screw and nut mechanism driven by a servo-motor, the minimum distance which separates the two plates during crimping is measured, this distance is compared with a reference value and the rotation of said servo-motor is controlled so as to cancel the difference between the minimum distance measured and said reference value.

One device according to the invention is characterized in that the mobile press plate is connected by an articulation to a first connecting rod which is articulated on a second connecting rod, of which the other end is articulated on a point of support which is located on a line parallel to the direction of displacement of said plates passing through the articulation of the first connecting rod and said device comprises means for displacing the articulation common to the two connecting rods and for bringing it on said line passing through the ends of the two connecting rods.

The point of support of the upper connecting rod is advantageously constituted by a piece which slides in a guide perpendicular to said plates, which sliding piece comprises a transverse opening having an inclined lower edge, in which a wedge is engaged and said device comprises means for driving said wedge more or less in said opening, which are controlled by a servo-motor.

According to a preferred embodiment, the means for displacing the wedge are constituted by a screw and nut mechanism driven step-by-step by a servo-motor.

In order to adjust the height of crimping, one device according to the invention comprises means for measuring the minimum distance which separates the two plates of the press when the two connecting rods are aligned and it further comprises means for controlling the servo-motor which displaces said wedge, with the result that the minimum distance measured respects a reference value.

The present invention results in the possibility of crimping terminals on conducting wires with the possibility of adjusting the minimum height between the crimping tools during crimping and therefore of indirectly adjusting the final thickness of the crimping with very high precision, of the order of some hundredths of millimetres.

The final thickness that a crimping must have for the terminal to be suitably fixed to the wire and for the electrical resistance of the junction to be in accordance with what is expected, is known by experiment, the latter factor being very important for connections within the composition of electronic circuits.

The devices according to the invention make it possible automatically to adjust the height of crimping from a measurement of minimum distance between the two plates of a press which is much easier to effect than a direct measurement of the height of crimping which is of the order of a millimeter only. The system for controlling the displacement of the mobile plate by a device incorporating articulated connecting rods forming compasses or a parallelogram makes it possible for the distance between the plates to pass through a minimum when the connecting rods are aligned, which is not the case when a means of displacement which exerts on the mobile plate an effort directed in the direction of displacement of the plate, is used.

This passage through a minimum makes it possible to measure the height of crimping and to adjust it with precision by displacing very slightly the point of support of the upper connecting rod by means of a wedge which makes it possible to obtain a very small vertical displacement with a large displacement of the wedge.

BRIEF DESCRIPTION OF THE DRAWINGS

The invention will be more readily understood on reading the following description with reference to the accompanying drawings, in which:

FIGS. 3 and 4 are vertical sections through two devices according to the invention.

DETAILED DESCRIPTION OF THE DRAWINGS

Figure 1:
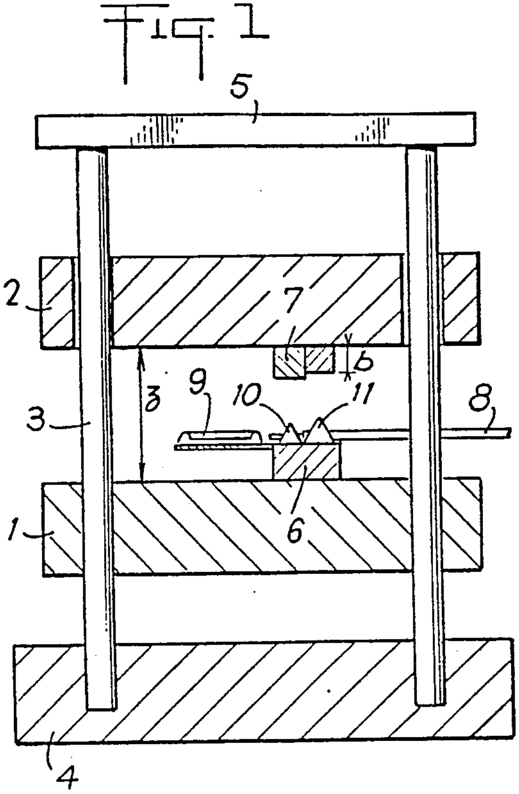
FIGS. 1 and 2 are schematic vertical sections through a crimping press.
Figure 2:
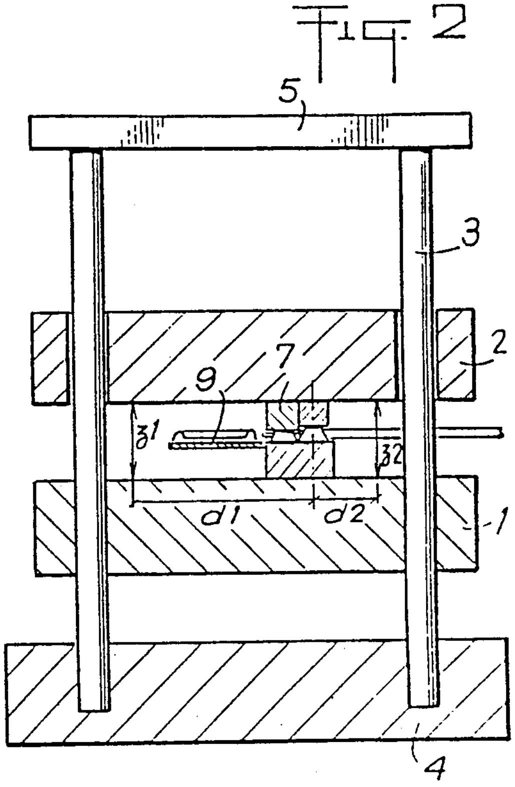

Referring now to the drawings, FIGS. 1 and 2 show vertical sections through a mechanical crimping press. These Figures schematically show a press which comprises a fixed horizontal plate, for example lower plate 1 and a mobile plate, for example upper plate 2, which slides vertically in guide columns 3 which are anchored in a solid base 4 and of which the tops are connected together by crosspieces 5 or any other equivalent metal structure.

The lower plate bears crimping dies 6 which cooperate with crimping punches 7 fixed beneath the upper plate.

FIG. 1 shows the mobile plate 2 in raised position.

This Figure shows a stripped end of a conducting wire 8 placed on a terminal 9, which is for example a female connecting piece with rolled edges, which comprises a first pair of fins 10 which are to be folded down and crimped on the stripped end of the wire in order to ensure the electrical connection, and a second pair of fins 11 which must be folded down and crimped on the insulating sheath of the wire 8 to ensure mechanical fixation. To render the drawing clearer, the terminal 9 has been shown enlarged. The terminal 9 may, of course, have other shapes, likewise the crimping fins.

The dies 6 and punches 7 are chosen as a function of the shape of the crimping fins. Let be the height of a die 6 measured from the upper face of the fixed plate 6 and b the height of the corresponding punch measured from the lower face of the mobile plate. Lengths and b are fixed and well known for a given set of crimping dies and punches.

FIG. 2 shows the press in maximum crimping position, i.e. in the position where the distance z between the two plates, which are assumed to be parallel, is minimum and equal to zero.

Height of crimping h represents the minimum distance between the stamp and the die at the moment when the plates of the press are closest to each other.

This height of crimping, which is of the order of a millimeter, corresponds substantially to the thickness of the metal and of the wire after crimping if it is admitted that the deformation obtained during crimping is absolutely permanent. In fact, there may remain a certain elasticity but there is still a well determined ratio between the height h defined hereinabove and the final thickness of the crimping. If the minimum distance zo between the two plates during crimping is measured and if a and b are the heights of the crimping die and punch, the formula $zo=a+b+h$ is obtained.

The final thickness of the crimping may therefore be determined from the measurement of the minimum distance zo and this thickness may be adjusted by acting on the distance zo which is the minimum distance between the two plates.

During crimping, considerable efforts come into play, for example a force of 30,000 newtons to crimp a terminal having a thickness of 0.2 mm on a wire with a diameter of 2 mm.

These efforts bring about an elongation of the columns and may provoke deformations thereof.

On the other hand, the press plates are generally very rigid and their deformations are negligible. The crimping thicknesses are of the order of 1 mm and experience has shown that, in order to obtain crimpings which are satisfactory from the electrical and mechanical standpoints, the height of crimping had to be adjusted with a high precision, of the order of some hundredths of millimeter which is very difficult to obtain. The deformations of the columns may cause the press plates to take non-horizontal positions and, in that case, the distance zo varies with the place where it is measured and the differences are greater than the desired precision. In order to take these deformations into account, the minimum distance between plates is advantageously measured at several points thereof.

The measurements are transmitted to a computer unit which calculates a weighted mean z' of these measurements and it is this weighted mean z' which is used to determine and to adjust the height of crimping $h=z'-(a+b)$.

In practice, the presses comprise two guiding columns and the deformations of the columns generally bring about a slope of the upper plate which lies in the plane of the two columns. In that case, two minimum distances z1 and z2 between the two plates are measured at two points located in the plane of the two columns at distances d1 and d2 on either side of a die associated with a stamp. In that case, the weighted mean $$z1 = \frac{d2z1 + d1z2}{d1 + d2}$$

is calculated.

In order to measure the distance z, any known distance sensor is used which is capable of measuring a relatively short distance with high precision. For example, an ultrasonic sensor is used which is fast with one of the plates and which sends an ultrasonic beam towards the other plate and which measures the time elapsing between the emission of an impulse and the reception of the echo.

The distance is advantageously measured by means of an interference fringe distance sensor.

Figure 3:
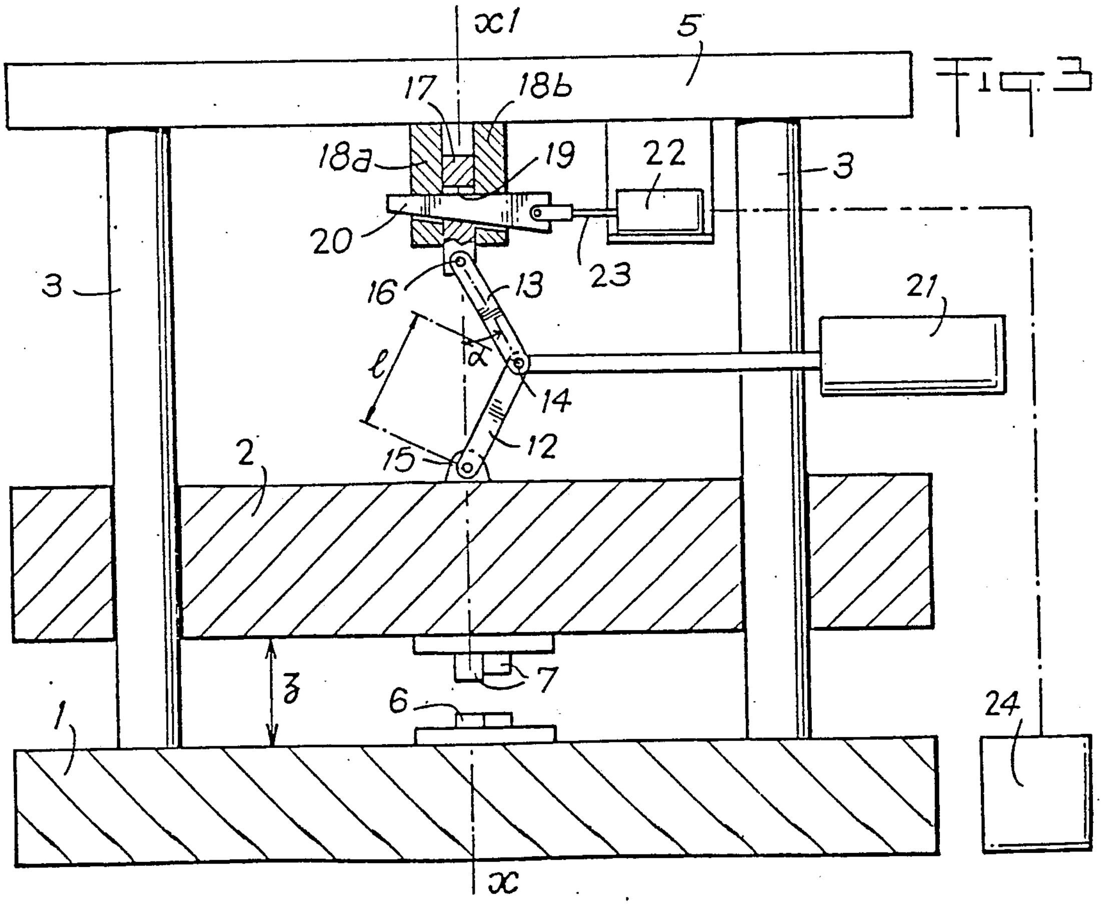

FIG. 3 is a partial vertical section of a crimping device according to the invention. This Figure shows again the upper plate 2 of a crimping press which slides without clearance on two guide columns 3 of which the upper ends are joined together by a crosspiece 5. The plate 2 bears on its lower face crimping punches 7. This Figure also shows again the fixed plate 1 which bears crimping dies 6. z represents the variable distance between the two plates: zo is the minimum distance during crimping. In order to displace the mobile plate 2 vertically by exerting thereon a sufficient vertical force to crimp a terminal on a wire, the device comprises two connecting rods 12 and 13 which are preferably identical and which are connected together by an articulation 14. The first connecting rod 12 is connected to the mobile plate by an articulation 15. The end of the second connecting rod opposite articulation 14 is connected to an articulation 16 which is borne by a mechanical piece 17 which may slide vertically without clearance between two fixed pieces 18*a* and 18*b* which constitute a vertical guide for the slide block 17 which serves as fixed point of support. Articulations 15 and 16 are aligned along a line zz1 which is parallel to the guide columns 3, i.e. in the direction of displacement of the plate 2 and which advantageously merges with the axis of the plate perpendicular thereto.

The slide block 17 is traversed right through by an opening 19 having a inclined lower edge in which is engaged a trapezoidal wedge 20 which is also engaged in two openings in the guide pieces 18*a* and 18*b*.

In each determined position of the wedge, the slide block is maintained in a fixed position, but this position is adjustable in height by driving in or withdrawing the wedge 20 more or less.

FIG. 3 shows the plate 2 in high position. The two connecting rods 12 and 13 are then inclined and they form with the vertical an angle $\alpha$. If 1 is the length of each connecting rod, the distance between the two articulations 15 and 16 is then equal to 2l cos $\alpha$. If the compasses formed by the two connecting rods are opened, point 16 remains fixed and the plate 15 moves downwardly. It passes through the lowermost position when the articulation 14 passes through line x-x1, i.e. when the two connecting rods are aligned. At that moment, the distance z between the two press plates is minimum and equal to zo and it is this which determines the deformation of the crimping pieces and the final thickness of crimping.

When one passes from the position shown in FIG. 3 to the position where the two connecting rods are aligned, point 14 is displaced by a length $x=l \tan \alpha$ and a vertical displacement of the plate 2: $d=2l(1-\cos \alpha)$ is obtained. The ratio d/x between the vertical displacement of the plate and the horizontal displacement of the articulation 14 is equal to $$\frac{2(1-\cos \alpha)}{\tan \alpha}.$$

If $\alpha$ is small, $\tan \alpha$ may be replaced by $\alpha$ and $1-\cos \alpha$ by $\alpha 2/2$. A reduction of the movement is therefore obtained and a small vertical displacement of the mobile plate and a considerable tightening effort may therefore be obtained from a greater horizontal displacement of the articulation 14 which requires a lesser effort. The articulation 14 is fixed for example to the rod of a hydraulic, pneumatic or electric jack 21 or to any other equivalent means of displacement.

When the two connecting rods are aligned, they are subject to compressive forces and by maintaining them in this position, a tightening effort is exerted on the press without having to exert any horizontal effort.

A parallelogram formed by two pairs of connecting rods symmetrical with respect to axis x-x1 may, of course, be used.

Point 14 is displaced horizontally for example by a hydraulic or pneumatic jack 21 or by any other equivalent means.

If the articulation 16 is displaced by a length $\epsilon$, the minimum distance zo between the two plates, which is obtained when the two connecting rods 12 and 13 are aligned, is modified by the same length and in the same direction. The horizontal displacement of the wedge 20 makes it possible vertically to displace slide block 17 and therefore likewise articulation 16. If wedge 20 is driven towards the left, point 16 descends and the minimum distance z decreases, therefore likewise the height of crimping and the final thickness of the crimping. If wedge 20 is withdrawn towards the right, the slide block 17 may rise higher when the connecting rods 12, 13 push it upwardly; the minimum distance zo increases and therefore the height of crimping increases and likewise the final thickness of the crimping. Taking into account the considerable efforts coming into play, the wedge 20 is firmly blocked.

A device according to the invention comprises a screw and nut mechanism 22 associated with a step-by-step servo-motor, which mechanism is connected by a rod 23 to the wedge 20 and displaces the latter in one direction or in the other when the two plates are spaced apart, which makes it possible to unblock the wedge and to displace it easily and rapidly.

A crimping station according to the invention is controlled by a computer unit 24 which automatically controls the sequence of the crimping operations of each series of identical terminals. For a series of determined terminals, which must be crimped on determined wires, the suitable height of crimping is known by experiment and the different heights of crimping are recorded in the memory of the computer in association with the characteristics of the terminals and the wires.

The servo-motor of the screw and nut mechanism 22 comprises a servo-control loop. This loop may be analog. The functions of the servo-control loop are preferably performed digitally by the computer unit.

When a series of determined terminals must be manufactured, the computer determines the corresponding height of crimping hc and it calculates the corresponding height zc by the formula $hc=zc-(a+b)$, a and b being constants which correspond to the set of punches and dies mounted on the press.

The computer unit communicates the reference value zc to the comparison member of the servo-control loop. Crimping begins and distance sensors measure the minimum distance zo between the two plates.

The comparison member determines the difference zo−zc or the computer unit calculates this difference and controls the servo-motor in order to displace the wedge 20 in the direction which tends to cancel this difference.

In a variant embodiment, in order to take into account deformations of the press, a plurality of sensors for detecting the distance between the two plates are used, for example two sensors placed at known distances d1 and d2 on either side of a crimping tool, which measure two minimum distances z1 and z2 as explained with reference to FIG. 2. The measured values z1 and z2 are transmitted to the computer unit which samples them, which determines the minimum values and which calculates a mean of these values, weighted as a function of distances d1 and d2.

In that case, the computer unit 24 calculates the difference between the weighted mean value and the reference value zc and it controls the servo-motor of the mechanism 22 to displace the wedge 20 in the direction which tends to cancel this difference.

In fact, when crimping a series of identical terminals, the automatic adjustment of the height of crimping begins with the crimping of the first terminal and it is possible that the first crimpings obtained are poor. The computer emits a signal when the difference between the measured value and the reference value exceeds a threshold and this signal may be used to control an alarm or a device for automatically rejecting the defective parts.

According to a preferred embodiment, the stroke of the jack 21, which displaces the articulation 14, is adjusted so that, upon crimping, the articulation 14 passes beyond axis x-x1 passing through the articulations 15 and 16 located at the ends of the two connecting rods, which guarantees that the minimum distance between the two press plates is attained and that, in addition, one passes twice over this minimum distance in the direction of closure then in the direction of opening of the press.

FIG. 4 shows a vertical section of a variant embodiment of a device according to the invention.

The parts homologous to those of FIG. 3 are designated by the same references.

In this embodiment, the device comprises a third plate 25 which is located above the mobile press plate 2 and which bears the articulation 16 of the upper connecting rod. This third plate 25 is mounted on two nuts ***26a*, *26b* which are screwed on the upper ends of the guide columns 3 which comprise a threading *3a***.

Each nut is fast with a toothed gear ***27a*, *27b* which meshes with a pinion 28 driven in rotation step-by-step by a servo-motor 29 which is controlled by the computer unit 24**.

The computer unit 24 receives the measurements of the distance z between the two plates, determines the minimum distance zc or the minimum weighted mean in the case of measurements made at several points. It compares this minimum distance with a reference value zc and it automatically controls the servo-motor 29 in order to displace the third plate 25 and therefore likewise the articulation 16 in the direction which tends to cancel the difference between the minimum distance zc measured and the reference value.

The servo-motor 29 is controlled when the two press plates 1 and 2 are spaced apart with the result that the displacement of the third plate 25 does not involve considerable efforts.

When the difference between the minimum distance zc and the reference value exceeds a determined threshold, the computer unit emits a signal which may control either a signalling indicating that the crimping is poor or an automatic rejection of the wire bearing the terminal whose crimping is indicated as being defective.

What is claimed is:

1. A process for mechanically crimping a terminal on a conducting wire by means of a press comprising a fixed plate and a mobile plate, said process comprising the following steps of:

displacing said mobile plate by means of two connecting rods, which articulated on each other, and of which the point of articulation is displaced to bring it on the line passing through the ends of the two rods, of which one is articulated on said mobile plate and the other is articulated on an adjustable point of support, which point of support is borne by a slide block mobile in a guide parallel to the direction of displacement of said plates, which block is traversed by an opening having an inclined edge, and displacing said point of support parallel to the direction of displacement of said plates in order to modify the height of crimping, by engaging a wedge in said opening and in the said guide, and by driving in said wedge more or less in order to vary the position of said slide block and said point of support.

2. The process of claim 1, wherein said wedge is displaced by means of a screw and nut mechanism driven by a servo-motor, the minimum distance which separates the two plates during crimping is measured, this distance is compared with a reference value and the rotation of said servo-motor is controlled so as to cancel the difference between the minimum distance measured and said reference value.

3. The process of claim 2, wherein the minimum distance which separates two press plates is measured at at least two points, the mean of these measurements weighted as a function of the distances from said points to the crimping tools is calculated so that this weighted mean follows a reference value.

4. A device for crimping a terminal on an electric wire and adjusting with precision the height of crimping and of the type in which a terminal is crimped on a conducting wire by placing said wire and said terminal between a fixed press plate and a mobile press plate, wherein said mobile press plate is connected by an articulation to a first connecting rod which is articulated on a second connecting rod, of which the other end is articulated on a point of support which is located on a line parallel to the direction of displacement of said plates passing through the articulation of the first connecting rod, and the device comprises means for displacing the articulation common to the two connecting rods and for bringing it on said line passing through the ends of the two connecting rods, wherein said point of support is constituted by a piece which slides in a guide perpendicular to said plates, which sliding piece comprises a transverse opening having an inclined lower edge, in which a wedge is engaged, and the device comprises means for driving said wedge more or less in said opening, which wedge driving means is controlled step-by-step by a servo-motor.

5. The device of claim 4, comprising means for measuring the minimum distance which separates the two plates of the press when the two connecting rods are aligned, and further comprising means for controlling the servo-motor which displaces said wedge, such that the minimum distance measured follows a reference value.

6. The device of claim 4, comprising means for measuring the minimum distances which separate the two plates of the press at several points when the two connecting rods are aligned and further comprising a central computer unit which calculates the mean of these measurements weighted as a function of distances from the points of measurement to the crimping tools and means which control the servo-motor which displaces said wedge, so that said weighted mean follows a reference value.

7. A device for crimping a terminal on an electric wire, while adjusting with precision the height of crimping, and of type in which a terminal is crimped on a conducting wire by placing said wire and said terminal between a fixed press plate and a mobile press plate, wherein said mobile press plate is connected by an articulation to a first connecting rod which is articulated on a second connecting rod, of which the other end is articulated on a point of support which is located on a line parallel to the direction of displacement of said plates passing through the articulation of the first connecting rod, and the device comprises means for displacing the articulation common to the two connecting rods and for bringing it on said line passing through the ends of the two connecting rods, the device comprising means for measuring the minimum distance which separates the two plates of the press when the two connecting rods are aligned, the device further comprising means for displacing said point of support, said means for displacing said point of support comprising a servo-motor, said device further comprising means for controlling said servo-motor, such that the minimum distance measured follows a reference value.

* * * * *